US010897637B1

(12) United States Patent
Pham et al.

(10) Patent No.: US 10,897,637 B1
(45) Date of Patent: Jan. 19, 2021

(54) SYNCHRONIZE AND PRESENT MULTIPLE LIVE CONTENT STREAMS

(71) Applicant: Amazon Technologies, Inc., Seattle, WA (US)

(72) Inventors: Dominick Pham, Seattle, WA (US); Charles Dorner, Seattle, WA (US); Xerxes Irani, Bainbridge Island, WA (US); Janet Galore, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 218 days.

(21) Appl. No.: 16/137,406

(22) Filed: Sep. 20, 2018

(51) Int. Cl.
| | |
|---|---|
| *H04N 21/242* | (2011.01) |
| *H04N 21/262* | (2011.01) |
| *H04N 21/234* | (2011.01) |
| *A63F 13/86* | (2014.01) |
| *H04N 21/6547* | (2011.01) |
| *H04N 21/8549* | (2011.01) |
| *H04N 21/25* | (2011.01) |
| *H04N 21/43* | (2011.01) |

(52) U.S. Cl.
CPC ........... *H04N 21/242* (2013.01); *A63F 13/86* (2014.09); *H04N 21/23406* (2013.01); *H04N 21/252* (2013.01); *H04N 21/262* (2013.01); *H04N 21/4305* (2013.01); *H04N 21/6547* (2013.01); *H04N 21/8549* (2013.01)

(58) Field of Classification Search
None
See application file for complete search history.

(56) References Cited

U.S. PATENT DOCUMENTS

| | | |
|---|---|---|
| 5,498,003 A | 3/1996 | Gechter |
| 5,715,416 A | 2/1998 | Baker |
| 5,872,575 A | 2/1999 | Segal |
| 6,065,042 A | 5/2000 | Reimer et al. |
| 6,097,393 A | 8/2000 | Prouty et al. |
| 6,282,713 B1 | 8/2001 | Kitsukawa et al. |
| 6,409,602 B1 | 6/2002 | Wiltshire et al. |
| 6,658,662 B1 | 12/2003 | Nielsen |
| 7,000,242 B1 | 2/2006 | Haber |

(Continued)

OTHER PUBLICATIONS

U.S. Appl. No. 16/137,851, "Content Stream Overlay Positioning", filed Sep. 21, 2018.

*Primary Examiner* — Ricky Chin
(74) *Attorney, Agent, or Firm* — Kilpatrick Townsend & Stockton LLP

(57) ABSTRACT

Techniques described herein include systems and methods for synchronizing multiple content streams for an event. A reference time point for an event being live-streamed by a plurality of streaming devices may be maintained. A plurality of content streams and manifest files may be received from streaming devices for the event where a manifest file includes a segment template and a timeline for a segment of content included in a content stream. The timeline may identify a capture time for the content generated by an associated streaming device of the streaming devices. The plurality of content streams may be synchronized by modifying the manifest files based on the capture times included in the manifest files and the reference time point. The plurality of content streams and the modified manifest files may be transmitted to a content viewing computer with instructions for synchronizing playback.

25 Claims, 11 Drawing Sheets

(56) References Cited

U.S. PATENT DOCUMENTS

| | | |
|---|---|---|
| 7,054,831 B2 | 5/2006 | Koenig |
| 7,162,197 B2 | 1/2007 | Kitamura |
| 7,671,893 B2 * | 3/2010 | Li ................... H04N 7/17318 |
| | | 348/211.3 |
| 7,715,642 B1 | 5/2010 | Collins et al. |
| 8,043,156 B2 | 10/2011 | Ackley et al. |
| 8,079,054 B1 | 12/2011 | Dhawan et al. |
| 8,221,220 B2 | 7/2012 | Ackley et al. |
| 8,613,020 B2 | 12/2013 | Knudson et al. |
| 8,893,173 B2 | 11/2014 | Briggs et al. |
| 8,910,201 B1 | 12/2014 | Zamiska et al. |
| 8,925,019 B2 * | 12/2014 | Ko ..................... H04N 21/816 |
| | | 725/74 |
| 9,438,937 B1 * | 9/2016 | Buchheit ............ H04N 21/4126 |
| 9,454,993 B1 * | 9/2016 | Lawson ........... H04N 21/47205 |
| 9,462,340 B1 | 10/2016 | Mathurin |
| 9,516,373 B1 | 12/2016 | Abecassis et al. |
| 9,596,502 B1 | 3/2017 | Abecassis et al. |
| 9,973,827 B2 | 5/2018 | Walker et al. |
| 10,403,042 B2 | 9/2019 | Roveta et al. |
| 10,687,106 B2 * | 6/2020 | Afshar ............ H04N 21/23439 |
| 2001/0001160 A1 | 5/2001 | Shoff et al. |
| 2001/0037303 A1 | 11/2001 | Mizrahi |
| 2001/0039571 A1 | 11/2001 | Atkinson |
| 2002/0033844 A1 | 3/2002 | Levy et al. |
| 2002/0052746 A1 | 5/2002 | Handelman |
| 2002/0069405 A1 | 6/2002 | Chapin et al. |
| 2002/0133562 A1 | 9/2002 | Newnam et al. |
| 2002/0144262 A1 | 10/2002 | Plotnick et al. |
| 2002/0162117 A1 | 10/2002 | Pearson et al. |
| 2003/0056212 A1 | 3/2003 | Siegel et al. |
| 2003/0149618 A1 | 8/2003 | Sender et al. |
| 2003/0149975 A1 | 8/2003 | Eldering et al. |
| 2003/0217210 A1 | 11/2003 | Carau |
| 2004/0068536 A1 | 4/2004 | Demers et al. |
| 2004/0073493 A1 | 4/2004 | Kato et al. |
| 2004/0255322 A1 | 12/2004 | Meadows et al. |
| 2005/0066352 A1 | 3/2005 | Herley |
| 2005/0132398 A1 | 6/2005 | Baran et al. |
| 2005/0144024 A1 | 6/2005 | Wojton et al. |
| 2005/0267813 A1 | 12/2005 | Monday |
| 2006/0123451 A1 | 6/2006 | Preisman |
| 2006/0184579 A1 | 8/2006 | Mills et al. |
| 2006/0291483 A1 | 12/2006 | Sela |
| 2007/0271580 A1 | 11/2007 | Tischer et al. |
| 2008/0015864 A1 | 1/2008 | Ross et al. |
| 2008/0052750 A1 | 2/2008 | Grunnet-Jepsen et al. |
| 2008/0089659 A1 | 4/2008 | Clapper |
| 2008/0115161 A1 | 5/2008 | Kurzion |
| 2008/0115655 A1 | 5/2008 | Weng et al. |
| 2008/0187279 A1 | 8/2008 | Gilley et al. |
| 2008/0221986 A1 | 9/2008 | Soicher et al. |
| 2008/0282283 A1 | 11/2008 | Hilton et al. |
| 2008/0285940 A1 | 11/2008 | Kulas |
| 2008/0295129 A1 | 11/2008 | Laut |
| 2009/0024922 A1 * | 1/2009 | Markowitz ............ G11B 27/10 |
| | | 715/716 |
| 2009/0094632 A1 | 4/2009 | Newnam et al. |
| 2009/0217316 A1 | 8/2009 | Gupta |
| 2009/0281908 A1 | 11/2009 | Wong |
| 2009/0293081 A1 | 11/2009 | Pirani et al. |
| 2009/0299752 A1 | 12/2009 | Rodriguez et al. |
| 2010/0131385 A1 | 5/2010 | Harrang et al. |
| 2010/0225811 A1 * | 9/2010 | Konvisser ............ G06F 16/487 |
| | | 348/512 |
| 2010/0256561 A1 | 10/2010 | Gillespie et al. |
| 2010/0275224 A1 | 10/2010 | Sheng et al. |
| 2010/0283741 A1 | 11/2010 | Heintze et al. |
| 2010/0332570 A1 | 12/2010 | Roberts et al. |
| 2011/0137753 A1 | 6/2011 | Moehrle et al. |
| 2011/0138326 A1 | 6/2011 | Roberts et al. |
| 2011/0167456 A1 | 7/2011 | Kokenos et al. |
| 2011/0276334 A1 | 11/2011 | Wang et al. |
| 2011/0289536 A1 | 11/2011 | Poder et al. |
| 2011/0310580 A1 | 12/2011 | Leung |
| 2012/0016678 A1 | 1/2012 | Gruber et al. |
| 2012/0084811 A1 | 4/2012 | Thompson et al. |
| 2012/0084812 A1 | 4/2012 | Thompson et al. |
| 2012/0110620 A1 | 5/2012 | Kilar et al. |
| 2012/0307145 A1 * | 12/2012 | Buchheit ............ H04N 21/8547 |
| | | 348/500 |
| 2013/0141529 A1 * | 6/2013 | Sathish ............... H04N 21/2365 |
| | | 348/43 |
| 2013/0304795 A1 | 11/2013 | Kang et al. |
| 2014/0053214 A1 * | 2/2014 | Walker ................... H04H 20/26 |
| | | 725/62 |
| 2014/0109161 A1 | 4/2014 | Chang et al. |
| 2014/0195675 A1 * | 7/2014 | Silver ................... H04L 65/607 |
| | | 709/224 |
| 2014/0229980 A1 | 8/2014 | Bill |
| 2014/0250477 A1 | 9/2014 | Kang et al. |
| 2014/0278834 A1 | 9/2014 | Lautz et al. |
| 2015/0249846 A1 * | 9/2015 | Klein ................... H04N 21/242 |
| | | 725/109 |
| 2015/0350733 A1 * | 12/2015 | Persidis ............ H04N 21/4781 |
| | | 725/24 |
| 2016/0037189 A1 * | 2/2016 | Holden ................ H04N 21/242 |
| | | 725/116 |
| 2016/0077573 A1 | 3/2016 | Lee et al. |
| 2016/0110877 A1 * | 4/2016 | Schwartz ............ G06F 16/7867 |
| | | 382/107 |
| 2016/0127763 A1 * | 5/2016 | Patel .................. H04N 21/4622 |
| | | 348/564 |
| 2016/0267879 A1 * | 9/2016 | Champel ............ H04N 5/44591 |
| 2017/0055004 A1 * | 2/2017 | Krietzman ......... H04N 21/4316 |
| 2017/0171577 A1 * | 6/2017 | Kipp .................... H04N 21/242 |
| 2017/0251231 A1 * | 8/2017 | Fullerton ........... H04N 21/8547 |
| 2017/0332131 A1 * | 11/2017 | Opsenica ........... H04N 21/4307 |
| 2018/0077467 A1 * | 3/2018 | Novobilski .......... H04N 21/454 |
| 2018/0109849 A1 * | 4/2018 | Moran ............... H04N 21/4884 |
| 2018/0227586 A1 * | 8/2018 | Choi .................... H04N 21/4307 |
| 2018/0255332 A1 * | 9/2018 | Heusser ........... H04N 21/21805 |
| 2018/0270516 A1 * | 9/2018 | Dalbec ........... H04N 21/440245 |
| 2018/0288470 A1 * | 10/2018 | Jeyachandran ...... H04L 65/4076 |
| 2019/0208234 A1 * | 7/2019 | Van Brandenburg ........................ |
| | | H04N 21/234345 |
| 2019/0267041 A1 * | 8/2019 | Ricciardi ............... G11B 27/031 |
| 2019/0297370 A1 * | 9/2019 | Afshar ................. H04L 65/604 |
| 2020/0107083 A1 * | 4/2020 | Holden ............... H04N 21/8358 |
| 2020/0169793 A1 * | 5/2020 | Kerfeldt ................ G06F 16/735 |

\* cited by examiner

SYNCHRONIZE AND PRESENT MULTIPLE LIVE CONTENT STREAMS

BACKGROUND

Live streaming content providers can enable users to explore, interact, and consume a variety of events (live sports games, live video game eSport events, live video game streaming content, etc.) and thereby explore a variety of real, virtual or non-real (e.g., fantasy or sci-fi) environments from the safety and comfort of their own homes. As streaming technology advances and the audience demand increases, more live streaming content providers seek to engage more users and satisfy the demand by providing additional content streams for the same live-event (e.g., multiple live streaming content streams for the same event). However, multiple live streaming content streams for the same event can lead to consumption problems for users as they are forced to open multiple web browser windows or tabs on their user devices which reduces the available screen real-estate and could negatively impact their consuming experience. Users could attempt to switch between live content streams of an event, but they may miss out on key moments in a live event without any indication that such an event is occurring in a parallel content stream. Conventional technology solutions may also fail to synchronize multiple live streams of an event and thereby further impact the user's consuming experience of the live event.

BRIEF DESCRIPTION OF THE DRAWINGS

Various embodiments in accordance with the present disclosure will be described with reference to the drawings, in which.

DETAILED DESCRIPTION

Figure 1:
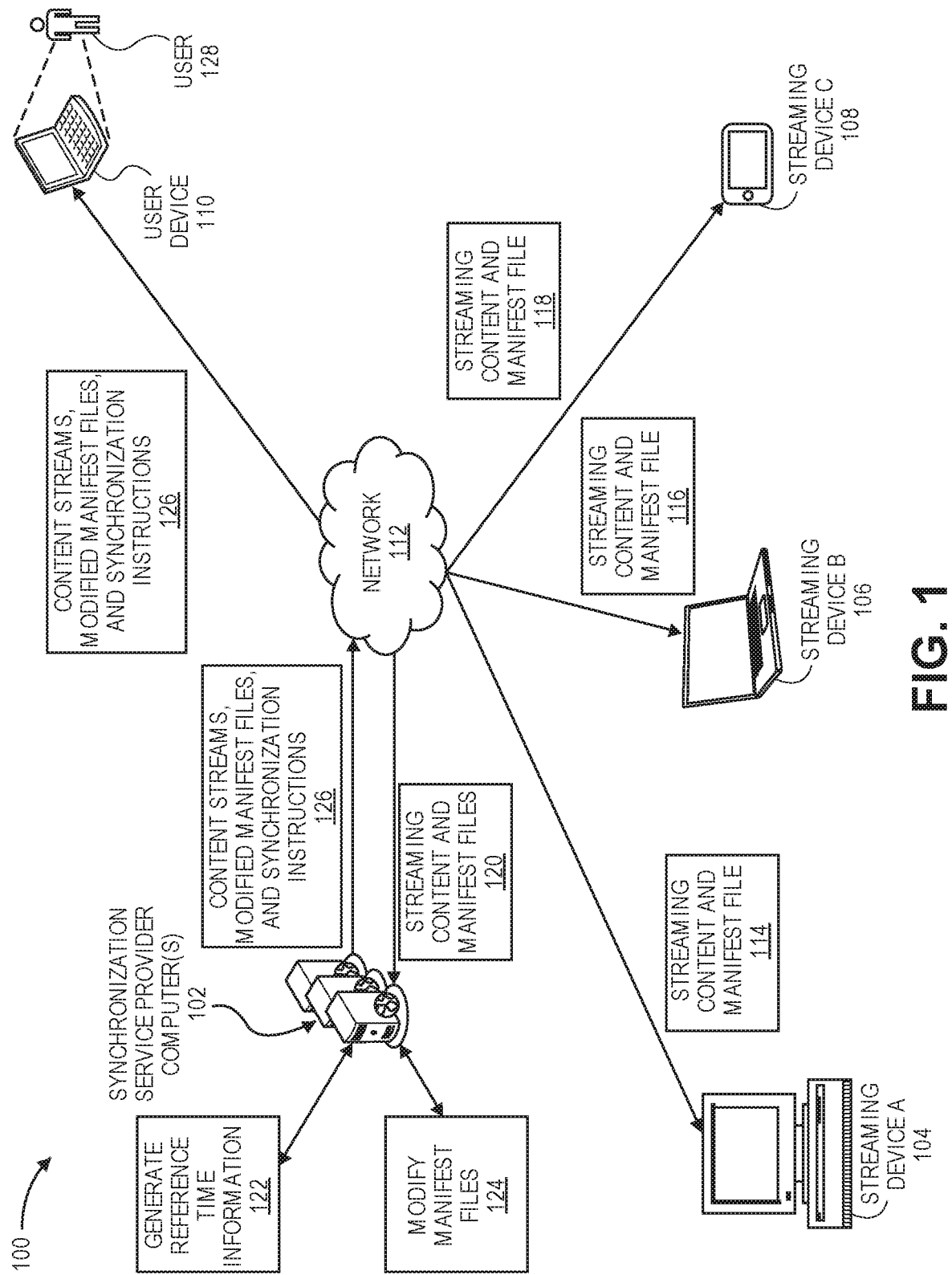
FIG. 1 illustrates a workflow of a synchronization feature that includes one or more streaming devices, a synchronization service provider computer(s), and a user device communicating over a network, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein provide for implementation of a synchronization feature that synchronizes two or more content streams for an event for use in presenting the one or more content streams in a simultaneous and synchronized fashion in a user interface of a user device. The synchronization feature may be implemented by a service provider computer (synchronization service provider computer(s)) to generate or maintain time reference information or data (reference time point) for an event which may include a live event that is being live-streamed by a content provider or a content provider is streaming content of the live event. An event may include a content stream that is associated with an event or a video game event. In embodiments, the service provider computer may be configured to obtain a manifest file from a content provider of the event. The manifest file may include a segment template and a timeline for a segment of content included in the content captured by the content provider. In accordance with at least one embodiment, the segment may include information which identifies an order of the segment respective to other segments provided by the content provider, a duration of the segment, and, the timeline may identify a capture time for the content generated by the content provider.

In embodiments, the service provider computer may modify the manifest files provided by streaming content providers to include the time reference information. The service provider computer may transmit the content streams and modified manifest files to a user device (content viewing computer) along with instructions for an application of the user device to synchronize multiple provided content streams using the modified manifest files. In accordance with at least one embodiment, the application may be configured to playback or present one or more synchronized content streams based on the modified manifest and a current time provided by the user device such that the application can buffer presentation of a portion of the received content streams using the reference time information, the capture times, and the current time. The synchronization feature may be implemented to modify a user interface to present, in a synchronized fashion, one or more content streams for a single event that are synchronized where each content stream may be from a different content provider and represent a different point of view or perspective of the event.

In accordance with at least one embodiment, the synchronization feature implemented by the service provider computers may determine and generate a relevance value for each content stream of the multi-content stream experience for an event. For example, a given content stream generated by a streaming content provider or computer may be assigned a relevance value based at least in part on one or more metrics. In embodiments, a user interface engaging in a multi-stream viewing or consumption experience may be modified to reflect the relevancy of a given content stream such that a more relevant stream may be presented in a first portion of a user interface and, a less relevant stream may be presented in a second portion of the same user interface. The second portion of the user interface may be of equal or lesser size than the first portion of the user interface. In embodiments, a user interface may have a primary, secondary, tertiary, and so on portions to reflect a gradient of relevancy where the primary portion is utilized to present the most relevant content stream of the event or multiple events, the secondary portion is utilized to present the second most relevant content stream, etc. The service provider computers implementing the synchronization features described herein may generate or determine a relevancy value for a given content stream based on one or more metrics that represent an active consuming experience by the user or a passive viewing experience by the user. For example, an active viewing experience may include using input provided by a user, such as clicking on a portion of the user interface that corresponds to a particular content stream of the plurality of synchronized content streams being presented. The service provider computer and/or user device may be configured to utilize the user input to identify the corresponding content stream as the most relevant content stream. A change in relevance between content streams may result in modification or updating of the user interface to reflect the most relevant streaming occupying the largest and most prominent portion of the user interface real-estate.

In embodiments, a passive viewing experience may utilize other metrics provided by other users viewing the same event, information provided by the event itself (e.g., in-game or in-video game information), or information provided by the content providers. For example, the service provider computer implementing the synchronization feature may be configured to obtain aggregate user input of users consuming the event (e.g., viewing or otherwise interacting with one or more of the plurality of content streams for the event) such as a number of users viewing, a number of users providing chat comments or emotes, or a number of users actively clicking on a particular content stream for the event. In video game information may include information obtained from a video game such as a match timer or game clock (in video game time clock). In embodiments, the service provider computer may analyze a received content stream to identify a time clock included in the content stream or it may obtain the in video game time clock in response to a time being passed to an event listener. The aggregate user input can be utilized to generate a relevance value for a given content stream and the service provider computers and/or the application on the user device may be configured to modify the user interface to present the most relevant content stream (e.g., highest relevance value) in a primary portion of the user interface. In accordance with at least one embodiment, the user interface may be gradually updated such that a more relevant content stream than the content stream that is currently occupying the primary portion of the user interface may periodically update to reflect a size and position change within the user interface. In accordance with at least one embodiment, a user may specify one or more thresholds which can be utilized to identify a speed at which the user interface is changed to reflect updated relevancy values of the content streams. For example, one user may specify a low threshold indicating that they would prefer that the changes occur quickly and frequently whereas another user may specify a high threshold indicating that they would prefer that the changes occur slowly and not very frequently.

In embodiments, the synchronization feature implemented by the service provider computers may include merging, combining, or interleaving one or more audio streams associated with content streams provided by content providers. The synchronization feature may include merging, combining, or interleaving chat streams associated with the content streams provided by the content providers. The merged, combined, or interleaved audio streams and chat streams may be presented via the user device and associated user interface to enhance the consumption experience of the user. In accordance with at least one embodiment, a volume of less relevant content streams, associated audio, and chat streams may be reduced based at least in part on their corresponding content streams relevancy value. For example, if a user is viewing three simultaneous content streams for an eSports league video game, the highest relevancy value stream may be enabled to provide text, emotes, and donation messages within the combined chat stream session. However, the other two less relevant streams, based on their associated relevancy values being less than the highest relevancy value stream, may be prohibited from providing text and instead limited to providing only emotes and donation messages to the combined chat stream session. In embodiments, less relevant audio streams may be reduced in audio level, for example a lower decibel value, in comparison to the most relevant audio stream based on each content streams relevancy value.

The processes and systems described herein may be an improvement on conventional content streaming platforms, broadcasting software, and streaming content applications. For example, conventional streaming platforms, software, etc., may be unable to simultaneously present and synchronize one or more content streams provided by different content providing devices for the same event. Conventional streaming platforms may lack the capability to identify a relevancy of one content stream over other content streams for the same event and generate a relevancy value for a given stream which can be used to modify the user interface presenting the synchronized content streams. Further, conventional streaming platforms may lack the capability to combine audio and chat streams associated with a video stream of a live event while also reducing a volume of particular audio and chat streams according to their respective relevancy values. Systems and methods described herein synchronize one or more content streams from a content provider for an event, determine a relevancy value for each content stream, and generate instructions to synchronize the content streams for playback via a user interface. Moreover, data can be provided to a user device for use in updating the user interface to reflect a change in the relevancy values as well as present an merged audio and chat stream of content that can enhance the user consumption experience while reducing confusion from oversaturation of data normally associated with combining chat and audio streams.

FIG. 1 illustrates a workflow of a synchronization feature that includes one or more streaming devices, a synchronization service provider computer(s), and a user device communicating over a network, in accordance with at least one embodiment. The workflow 100 of FIG. 1 includes synchronization service provider computers 102 in communication with one or more streaming devices (104, 106, and 108) as well as user device 110 via network 112. In accordance with at least one embodiment, streaming devices 104, 106, and 108 may be configured to capture streaming content (e.g., video and audio streaming content) for an event such as a live-streaming eSports match between two teams. In embodiments, each streaming device 104, 106, and 108 may transmit streaming content, including the audio and video, with a manifest file for the streaming content to the synchronization service provider computers 102 via network 112 (depicted as 114, 116, 118). A manifest file may include a segment template which corresponds to the content segments that are provided by streaming devices 104, 106, and 108 to synchronization service provider computers 102 associated with the streaming content, and a timeline. In embodiments, the segment template may include a value or other indicator which identifies an order for the segment to be presented with respect to other segments. The timeline may include information which identifies a capture time for when the audio and video of the content stream was captured by a given streaming device (104, 106, or 108) as well as a duration for the segment of content.

The streaming content and manifest files 120 may be received by synchronization service provider computers 102. In accordance with at least one embodiment, upon a streaming device, such as streaming device A 104, capturing streaming content, the synchronization service provider computers 102 may generate a reference time point or reference time information 122.

In some embodiments, the reference time information 122 may be based on a network time protocol (NTP) which can be utilized by the synchronization service provider computers 102 or user device 110 to synchronize received streaming content and manifest files. In accordance with at least one embodiment, the synchronization service provider computers 102 may generate the reference time information 122 based at least in part on information provided by the event, such as in game clock or video game clock which represents when the event started. In accordance with at least one embodiment, the synchronization service provider computers 102 may modify 124 the received manifest files 120 to include the reference time information 122 for use by the user device 110 to synchronize one or more incoming streams of content from streaming devices 104, 106, and 108. In accordance with at least one embodiment, the synchronization service provider computers 102 may analyze the content (114, 116, and 118) from streaming devices 104, 106, and 108 to identify a synchronization indicator associated with the event such as a watermark or an inaudible marker provided by a video-game to synchronize the content streams (114, 116, and 118) and or generate reference time information 122.

The workflow 100 depicts the synchronization service provider computers 102 transmitting the content streams, the modified manifest files, and synchronization instructions 126 to the user device 110. In accordance with at least one embodiment, the user device 110 may be configured to utilize a software application that is further configured to utilize the synchronization instructions 126 as well as a current time of the user device 110 to delay or otherwise buffer portions of the content streams 126 which includes streaming content 114, 116, and 118 for synchronized playback. For example, the streaming content and manifest files 114 generated by streaming device A 104 may be transmitted, via the synchronization service provider computer 102 to the user device 110 a few seconds before the streaming content and manifest files 116 from streaming device B 106 are transmitted. The software application of user device 110 may be configured to utilize the capture time and reference time information included in the modified manifest file 126 as well as the current time of the user device 110 to delay or buffer the streaming content 114 such that the user device may present, via a user interface, synchronized playback of the streaming content 114 and 116.

By delaying or buffering playback of certain content streams using the capture time, reference time information, and the current time of the user device 110, a user interface may present synchronized playback of multiple streaming devices of a single event for consumption by user 128. In embodiments, the synchronization feature described herein may utilize a naturally occurring latency between capture of the streaming content (e.g., 114) by a streaming device (e.g., 104) and transmission of the content, via network 112, to the user device 110 to generate an appropriate buffer for use in synchronizing the time information from multiple streaming device's manifest files to present synchronized playback of a single or the same event such as a live-streaming video game content stream. It should be noted that although the workflow 100 of FIG. 1 depicts three streaming devices (104, 106, and 108) capturing content for a single event at the beginning of an event the synchronization features described herein can be applicable to streaming devices that begin capturing content for the event after it has begun. For example, the synchronization service provider computers 102 may be configured to receive one or more newly added content streams and manifest files which include capture time from the new streaming device and utilize the newly received information (content stream and manifest file) with the maintained reference time information 122 to enable synchronized playback that can be interleaved into the existing three content streams (114, 116, and 118). In embodiments, the application of the user device 110 may receive the newly added streaming content and newly added modified manifest to incorporate the user interface to present synchronized playback of the newly captured stream of content using the capture time, reference time information, and current time as described above.

Figure 2:
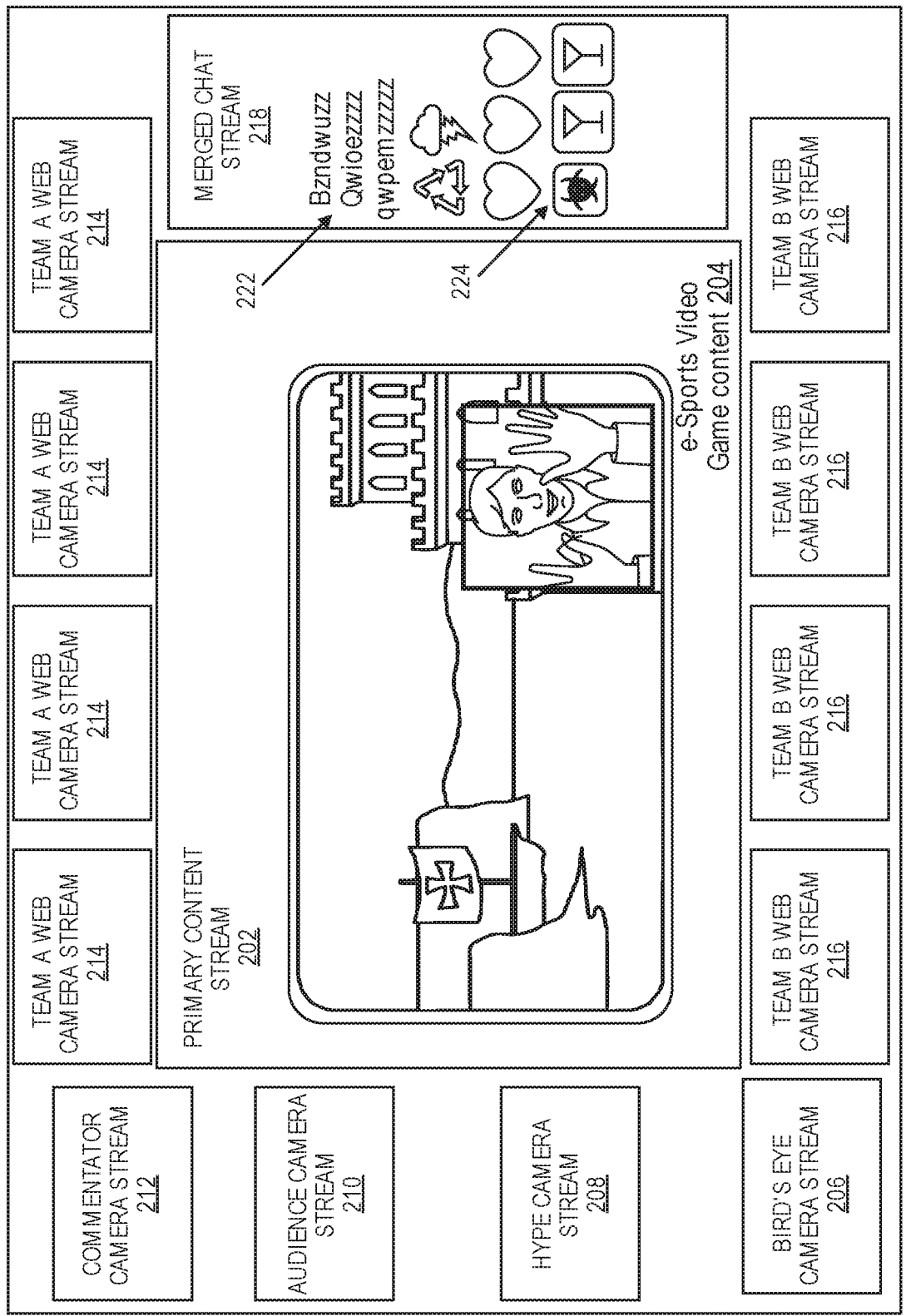
FIG. 2 illustrates an example user interface implementing the synchronization feature which includes multiple content streams from a plurality of content streams provided by content providers, in accordance with at least one embodiment.

FIG. 2 illustrates an example user interface implementing the synchronization feature which includes multiple content streams from a plurality of content streams provided by content providers, in accordance with at least one embodiment. FIG. 2 illustrates a user interface 200 that presents a plurality of synchronized streaming content captured by various streaming devices and different perspectives for an event. For example, the user interface 200 of FIG. 2 includes a primary content stream 202 portion of the user interface 200 which is presenting e-Sports video game content 204. As described herein, the user interface 200 may include a synchronized presentation of multiple content streams for a single or same event by modifying manifest files. As described herein, placement and pixel size of each content stream presented in the user interface may be based on a relevance value associated with each content stream with a higher relevancy value content stream taking up a larger real estate of the user interface 200. The multiple content streams for the event (e-Sports video game match) may include a bird's eye camera stream 206, a "hype" camera stream 208, an audience camera stream 210, and a commentator camera stream 212. Each of the multiple content stream sources for 204-212 may be captured by different streaming devices for the event but present different perspectives for the event and are presented via user interface 200 in a synchronized manner such that a consuming user can enjoy multiple perspectives of the same event without having to switch between screens, user interface elements, or web browser tabs.

For example, bird's eye camera stream 206 may receive and capture streaming content from a bird's eye view of the e-Sports video game match (event) while audience camera stream 210 may receive and capture streaming content of a camera that is directed at an audience viewing the e-Sports video game from within a studio. User interface 200 also depicts four web camera streams for two teams participating in the e-Sports video game match (event) at 214 and 216. Each web camera stream for a team may be a separate streaming device and be configured or directed to capture a person or player participating in the event or at their input/output devices such as mouse and keyboard. The user interface 200 may include a merged chat stream 218 which includes a merged input stream from various users or viewers of the streaming content for the event. For example, multiple users or viewers may view and participate in the event via a chat room provided by a streaming content provider that is hosting the event and may be associated with the synchronization service provider computers. Users may interact with a given chat stream for one of the multiple content streams represented in FIG. 2 and have their chat merged with other users who are interacting with another chat room for another content stream for the event. For example, the merged chat stream 218 may include text input 220 from users who are viewing the commentator camera stream 212 as well as emotes 222 from users viewing the primary content stream 202. The synchronization feature described herein uses the modified manifest files and time information (reference time information, capture time information, and current time information) to generate instructions for interleaving and presenting multiple content streams via a user interface that are synchronized so that a user can view multiple perspectives of the same event without being burdened by latency between the streaming devices. As described herein, the user device may buffer certain received content streams to match other received content streams according to the modified manifest files associated with the corresponding streams and present them together in the user interface in a synchronized fashion.

Figure 3:
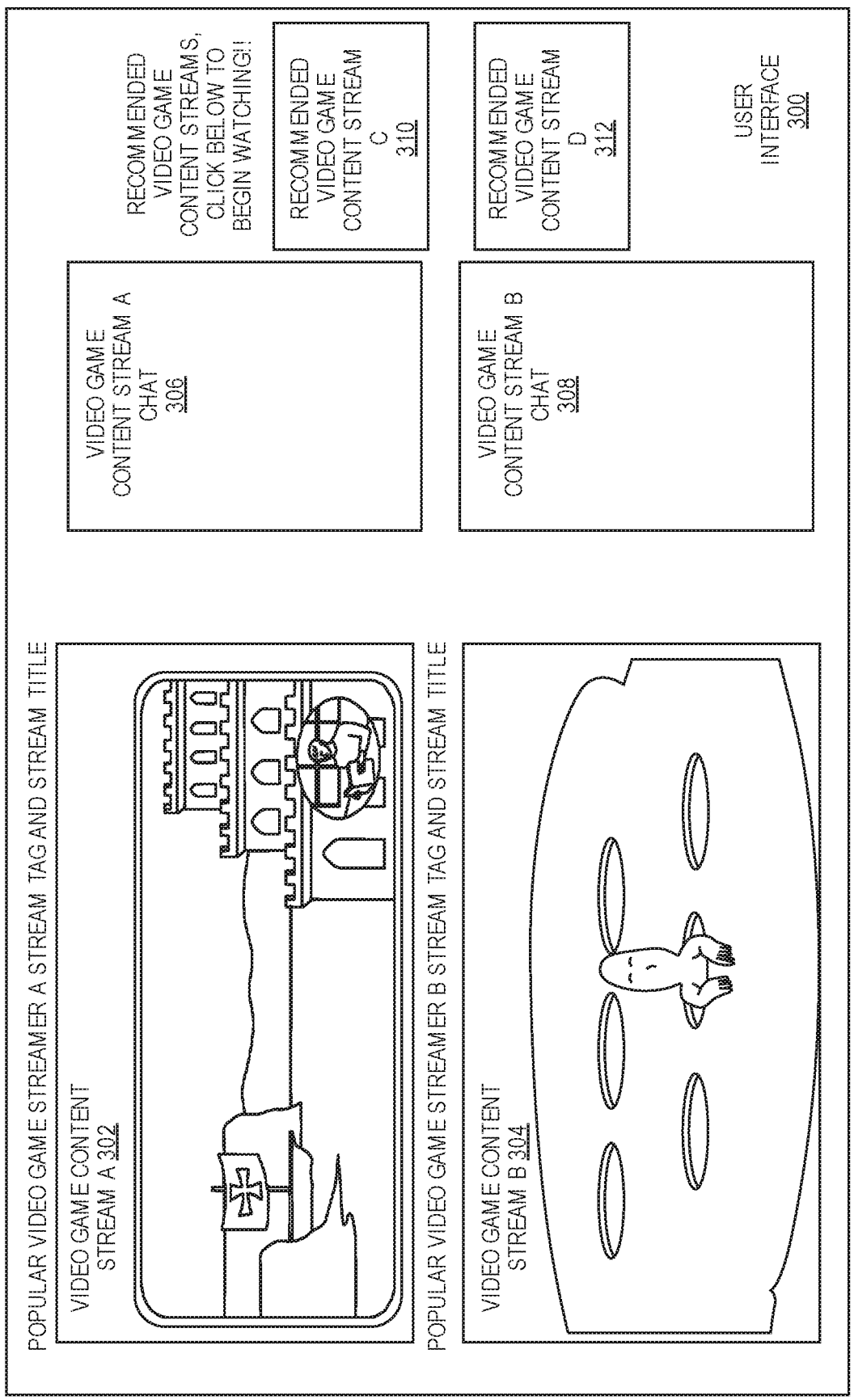
FIG. 3 illustrates an example user interface implementing the synchronization feature which includes multiple content streams from a plurality of content streams provided by content providers, in accordance with at least one embodiment.

FIG. 3 illustrates an example user interface implementing the synchronization feature which includes multiple content streams from a plurality of content streams provided by content providers, in accordance with at least one embodiment. FIG. 3 includes user interface 300 which presents multiple content streams for different events but in the same user interface to avoid users having to switch web browser tabs. User interface 300 includes a first content stream (video game content stream A 302) and a second content stream (video game content stream B 304) which may each be associated with a popular video game streaming for a streaming content provider. In embodiments, each content stream (302 and 304) may be associated with a chat stream, 306 and 308, respectively. A user may interact with user interface 300 to provide chat, text, or emotes in either chat stream 306 or 308. As described herein, a user may desire to engage in a more active viewing or consumption experience and only consume one of the multiple content streams being presented via user interface 300.

For example, a user may use an input/output device of a user device such as a mouse or keyboard to select content stream A 302 in user interface 300. In accordance with at least one embodiment, the user interface 300 may be configured to update in response to receiving the user input to increase the size and change the position within the interface 300 to present the content stream A 302 in a more prominent manner. Various user interface presentation modifications to reflect prominence of one content stream or the other may be utilized such as completely removing content stream B 304, placing content stream B 304 in a picture in picture (PIP) position within the content stream A 302, placing content stream B 304 in one of the corners or user interface 300, or other suitable placements of the content streams within the user interface. In accordance with at least one embodiment, the synchronization service provider computers implementing the synchronization feature may identify and recommend one or more content streams (310 and 312) based on attributes or metrics obtained from other users interacting with a streaming content provider.

In embodiments, aggregate user input such as active viewers for a content stream, number of participating chat members, number of users actively selecting a particular content stream, or other metrics may be utilized to select and generate recommendations for other content streams that the user may navigate to via the user interface 300 as depicted at 310 and 312. In accordance with at least one embodiment, the synchronization feature may include defining a user interface layout to present multiple content streams in a user interface based on a relevancy value associated with each content stream. For example, one user interface layout may present the most prominent content stream at a center X and Y position of a certain pixel size of the user interface (based on the content stream having the highest relevancy value) while presenting the remaining portion of less prominent content streams at the four corners of the user interface based on their relevancy values being lower than the most relevant content stream. In accordance with at least one embodiment, the synchronization service provider computers implementing the synchronization features described herein may generate one or more content highlights that include video and audio from one of the currently viewed content streams (302 or 304) for presentation within the user interface 300 as a recommended stream similar to 310 and 312. In embodiments, the content highlights may be generated and provided as a separate content stream to a user device, with a modified manifest file, based on user engagement metrics for a particular time period in the content streams 302 and 304. For example, a highlight content stream may be generated based on a spike in user engagement for a particular time segment of a content stream as it indicates a high level of excitement which a user may wish to view in a replay or highlight content stream.

Figure 4:
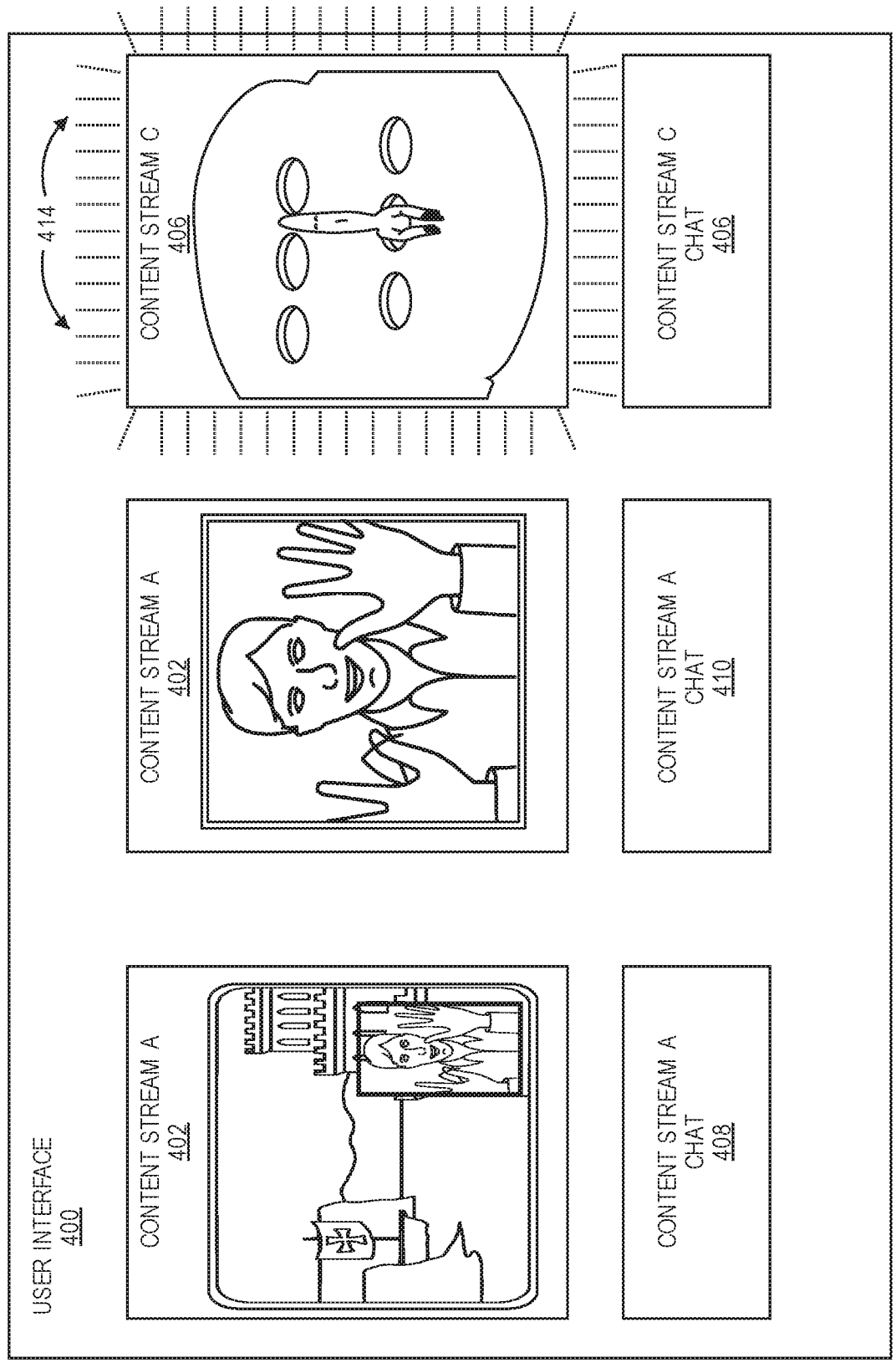
FIG. 4 illustrates an example user interface implementing the synchronization feature which includes multiple content streams from a plurality of content streams provided by content providers, in accordance with at least one embodiment.

FIG. 4 illustrates an example user interface implementing the synchronization feature which includes multiple content streams from a plurality of content streams provided by content providers, in accordance with at least one embodiment. FIG. 4 depicts user interface 400 presenting multiple content streams (402, 404, and 406) from different content provider sources. User interface 400 depicts content chat streams (408, 410, and 412) which correspond to content streams 402, 404, and 406 respectively. In accordance with at least one embodiment, the synchronization feature implemented by the synchronization service provider computers can visually or audibly indicate a more relevant stream or a change in associated relevancy values for one or more content streams (402, 404, and 406) presented via user interface 400. For example, FIG. 4 includes a visual highlight or other indicator 414 which may serve as an indicator interacting with user interface 400 that content stream C 406 is more relevant than the other two content stream content stream A 402 and content stream B 404.

As described herein, a higher relevance value for a stream may translate to a more enjoyable content viewing or consumption experience for the user. In embodiments, the user interface 400 may be updated to reflect a change in relevancy values between one or more content streams presented in the user interface 400 such that a user may actively provide input to select the indicated content stream (e.g., content stream C 406). To further illustrate the example, if the user provides user input which corresponds to a selection of content stream C 406 the user interface 400 may be updated to place content stream C 406 in a more prominent position (X and Y location within user interface 400) as well as update the size of content stream C 406 to a larger pixel size while simultaneously reducing the pixel size and X and Y position of content stream A 402 and content stream B 404 in user interface 400.

The user interface 400 may be configured to provide an auditory indicator of a recommended more relevant stream based on updated relevancy values for one or more streams currently being presented via the user interface 400. For example, the audio stream for the recommended stream (content stream C 406) may be increased in decibel level while the audio streams for the other two content streams (content stream A 402 and content stream B 404) are reduced in decibel level to draw the user's attention to the recommended stream. In accordance with at least one embodiment, the synchronization service provider computers may maintain one or more thresholds, that are user or content provider specified, which may be used to generate the visual (414) and/or auditory (not pictured) indicators or recommendations for more relevant content streams as the threshold indicated by a given user may be associated with an active experience. In an active viewing or consumption experience the user may only wish to be informed of the update in relevancy of the content streams and select when and how to update the user interface 400 to reflect the change of focus to one content stream over another. User's may also specify preferences to update the user interface 400 upon receiving their input selecting a particular content stream rather than have an application of the user interface and/or the synchronization service provider computers make a selection on their behalf and update the user interface 400 automatically as described below in FIG. 5. In accordance with at least one embodiment, the visual indicator 414 recommending a particular content stream such as content stream C 406 may be based on historical viewing, interacting, or consumption behavior of the user. For example, content stream C 406 may be a content stream which a particular user selects after a certain period of time of viewing multiple content streams (content stream A 402 and content stream B 404) via the user interface 400. Historical behavior data about a user's viewing and interacting experience with particular content streams can be utilized to recommended and visually indicate certain content streams over others in the user interface 400.

Figure 5:
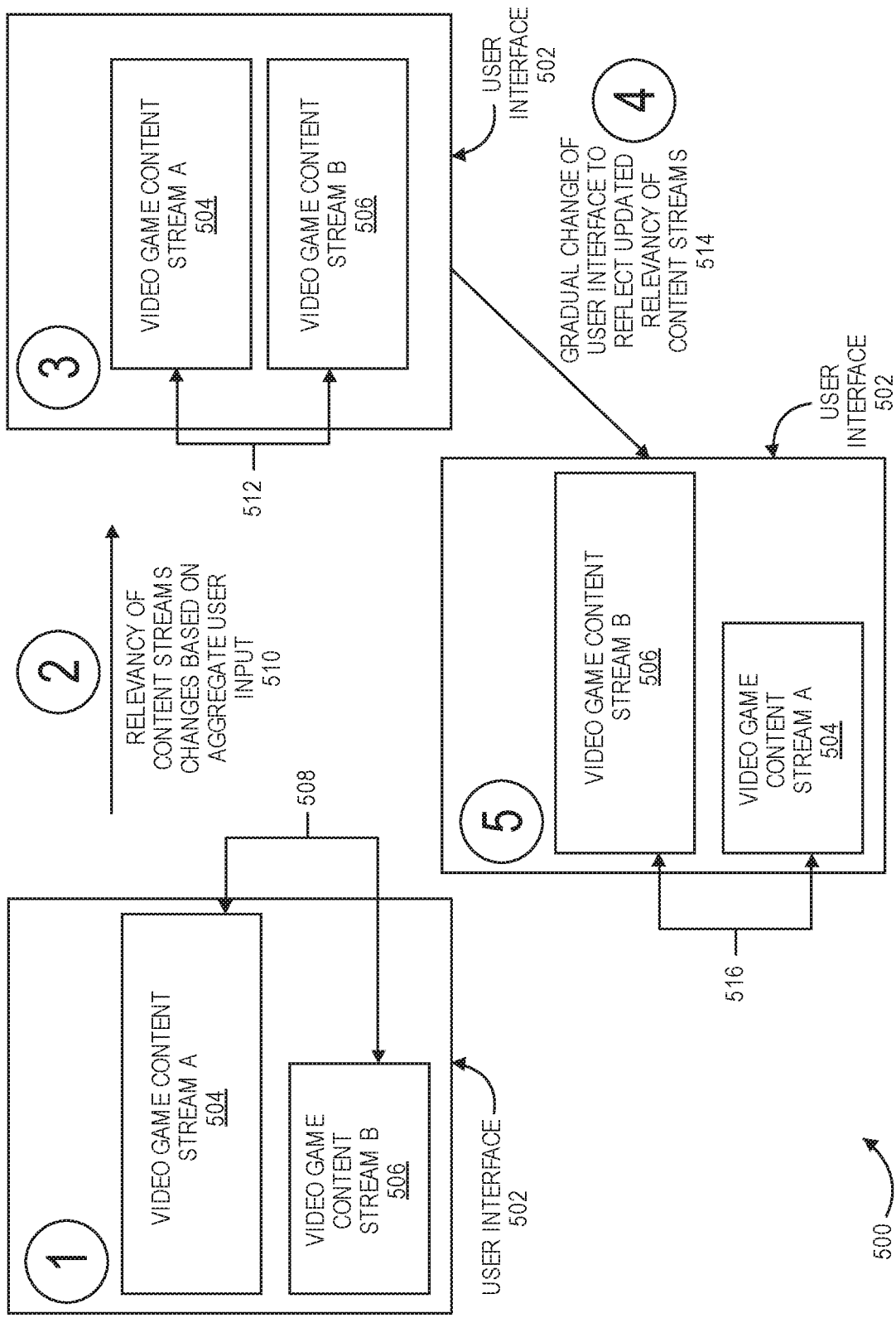
FIG. 5 illustrates a workflow of a synchronization feature for modifying a user interface in response to a relevancy value associated with a content stream, in accordance with at least one embodiment.

FIG. 5 illustrates a workflow of a synchronization feature for modifying a user interface in response to a relevancy value associated with a content stream, in accordance with at least one embodiment. The workflow 500 of FIG. 5 includes several operations which reflect a gradual or periodic update to a user interface 502 which reflects a change in relevancy values between synchronized content streams being presented via the user interface 500. In workflow 500 at operation 1, the user interface 502 is depicted to present two content streams, video game content stream A 504 and video game content stream B 506. The two content streams, 504 and 506, are configured in a first configuration and each are depicted as having different pixel sizes 508 within user interface 502 based on their respective relevancy values. In embodiments, a larger pixel size and more centralized position within user interface 502 may indicate that a content stream is associated with a higher relevancy value than another synchronized content stream being presented via the same user interface 502.

In accordance with at least one embodiment, the synchronization service provider computers implementing the synchronization feature may determine a relevancy value for a given content stream (e.g., 504 and 506) based at least in part on one or more attributes or metrics. For example, a relevancy value for a content stream may be based at least in part on in-game information provided by a video game, wherein the event is a live-streamed video game. For example, the in-game information provided by the video game may include a particular graphic, text, or audio data point that can be used by the service provider computer to determine a relevance value for the corresponding content stream. To further illustrate the example, in a video game a particular player that is live-streaming their gameplay of the video game may score three kill shots on an enemy team which can cause the video game to provide a graphic indicating a "triple kill." The service provider computer may be configured to listen for the graphic representation of "triple kill" and respond by increasing the relevancy value for that particular content stream. In embodiments, determining the relevancy value may be based at least in part on aggregate user input provided by users interacting with the plurality of content streams. In embodiments, the service provider computer may be configured to listen for the audio fingerprint of "triple kill", perform image recognition on the video to look for the "triple kill" user interface component, or subscribe to game events from an application programming interface (API) provided by the game developer, and respond by increasing the relevancy value for that particular content stream. Aggregate user input may include chat comments, emotes, donations, etc., provided by the users, active clicks or interactions with the particular content stream, or views of the particular content stream. In accordance with at least one embodiment, the relevancy value for a content stream may be determined by the service provider computer based at least in part on input provided by the content streaming user or streaming device itself. For example, information identifying actions per minute (APM) performed by the streamer may be used to determine a relevancy value for the corresponding content stream where higher APMs result in a higher relevancy value.

In workflow 500 at operation 2, the relevancy values of video game content stream A 504 and video game content stream B 506 may be updated based on aggregate user input at 510. For example, a number of viewers may have recently started watching video game content stream B 506 from their respective user devices. The data point or attribute associated with an increased viewership for a particular content provider may be used by the synchronization service provider computers to update the relevancy values for video game content stream A 504 and video game content stream B 506. In workflow 500 at operation 3, the user interface 502 is updated 512 to depict a change in the pixel size and position within user interface 502 for video game content stream A 504 and video game content stream B 506. The user interface 502 at operation 3 depicts an update 512 which positions and changes the size of video game content stream A 504 and video game content stream B 506 to be of equal pixel size and more centrally located with respect to the user interface 502.

In workflow 500 at operation 4 the user interface 502 is configured to gradually change or periodically update 514 the user interface 502 based on the thresholds maintained by the synchronization service provider computers. For example, some users may specify thresholds such that the gradual or periodic update to reflect relevancy values of content streams in the user interface 502 occurs at a slower speed compared to other users who may specify thresholds such that the gradual or periodic update to reflect relevancy values of content streams in the user interface 502 occurs much faster or at an increased interval. In workflow 500 at operation 5 the user interface 502 completes its update 516 to depict video game content stream B 506 having a larger pixel size than video game content stream A 504 and placed more centrally in the user interface 502. Although FIG. 5 illustrates the update of the user interface 502 to depict the swapping of pixel size and position within user interface between video game content stream A 504 and video game content stream B 506, the synchronization features described herein include other variations of pixel size and position within a given user interface to reflect an update in prominence or particular value to a given user consuming the content presented via user interface 502.

Figure 6:
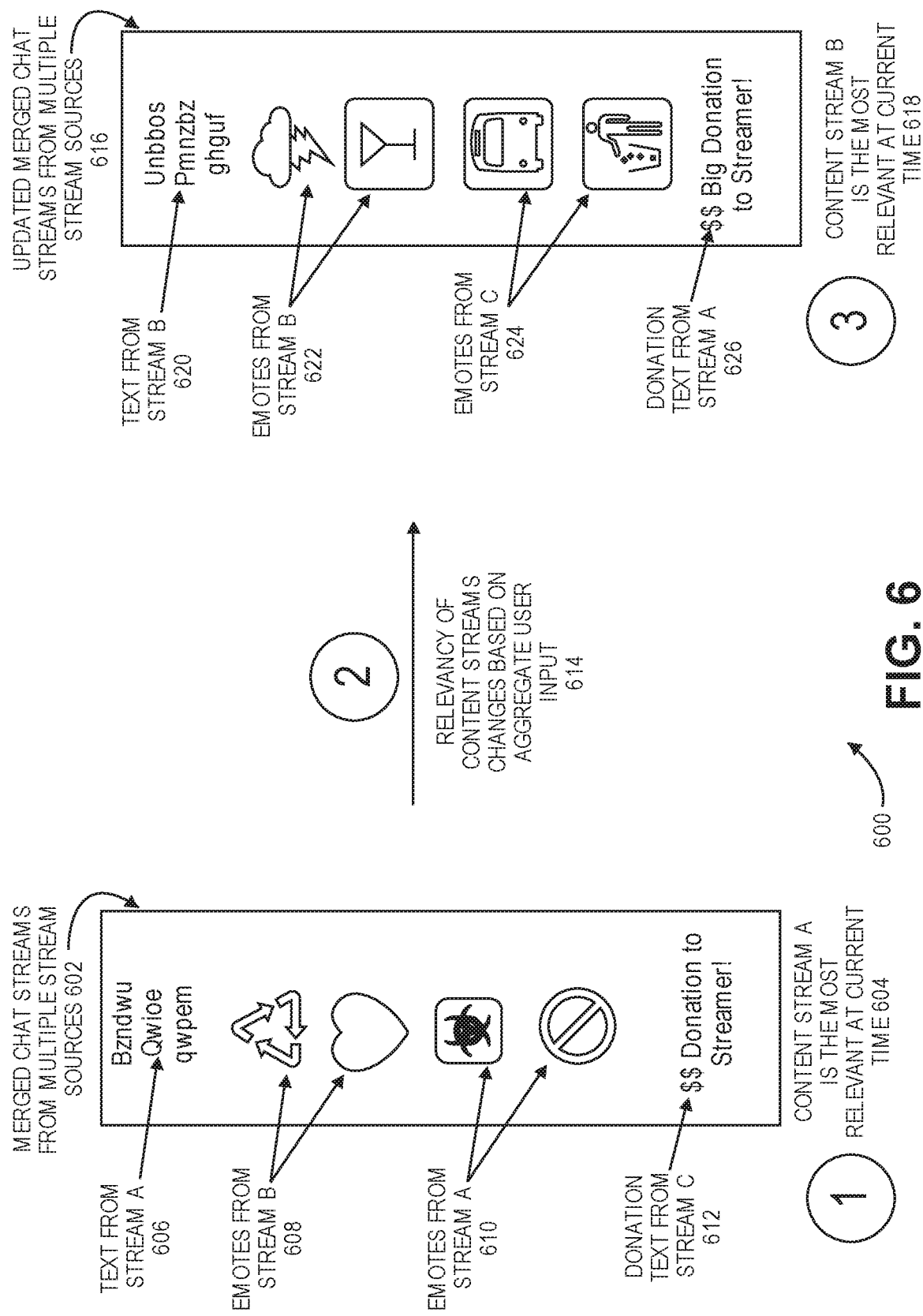
FIG. 6 illustrates a workflow of a synchronization feature for merging one or more chat streams associated with a live content streaming event, in accordance with at least one embodiment.

FIG. 6 illustrates a workflow of a synchronization feature for merging one or more chat streams associated with a live content streaming event, in accordance with at least one embodiment. The workflow 600 of FIG. 6 includes a number of operations for a synchronization feature corresponding to merging chat content streams from one or more streaming content sources, reducing the volume of the chat or audio of a chat content stream based on the originating content streams relevancy value, and updating the chat content stream based on updated relevancy values for the originating content stream. In workflow 600 at operation 1, a merged chat stream from multiple stream sources 602 is depicted to represent that content stream A is the most relevant content stream at a current time 604 for operation 1. Merged chat stream from multiple stream sources 602 includes input from several sources including text from stream A at 606, emoticons (emotes) from stream B at 608, emotes from stream A at 610, and a donation text from stream C at 612. In accordance with at least one embodiment, the synchronization features may reduce the volume of chats from less relevant content streams in a merged chat session by prohibiting presentation of certain types of input from the less relevant content streams. For example, in merged chat stream from multiple stream sources 602 content stream A is the most relevant 604 and the merged chat stream 602 may be configured to allow presenting of text, emotes, and donations from the stream A source. However, the merged chat stream 602 may prohibit presentation of text input or donations input from stream B and only allowing donation text 612 from stream C.

In accordance with at least one embodiment, the synchronization feature may include reducing audio levels such as a decibel level from merged audio streams for synchronized content streams such that the most relevant of the synchronized content stream is the most audible for a viewer as opposed to the lower volume audio content from less relevant content streams. The workflow 600 at operation 2 depicts a change in relevancy values between the content streams at 614. As described herein, the synchronization feature may apply various rules or policies which prohibit the type of input from less relevant content streams being presented via a merged chat stream, such as updated merged chat streams from multiple stream sources 616, or audio stream (not pictured). At operation 3 of workflow 600 content stream B is now the most relevant content stream at an updated time 618. The updated merged chat streams from multiple stream sources 616 illustrated in workflow 600 includes now text from stream B 620, emotes from stream B 622, emotes from stream C 624, and input from stream A has been limited to only donation text 626 based on the updated relevancy values between stream A, stream B, and stream C.

Figure 7:
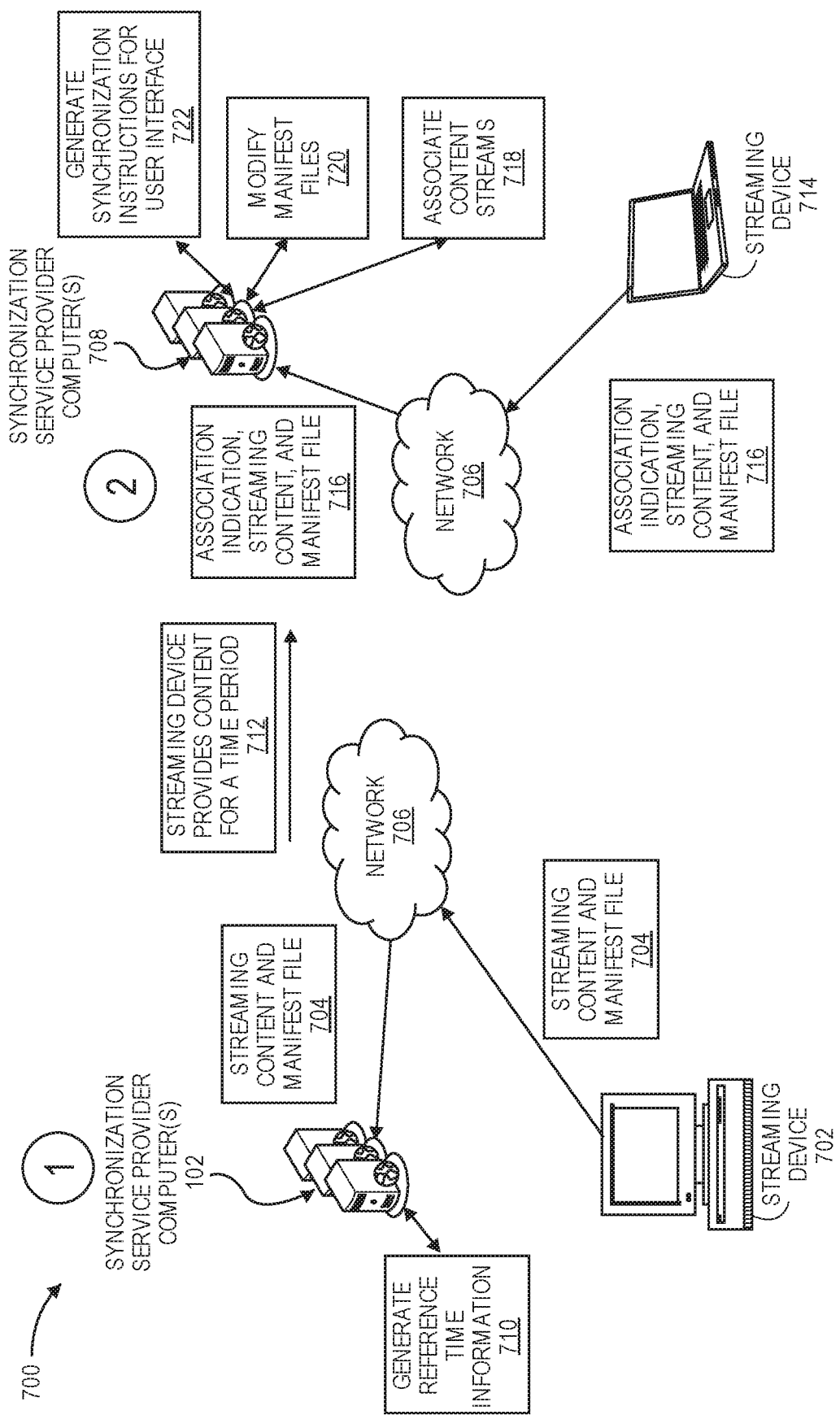
FIG. 7 illustrates a workflow of a synchronization feature for synchronizing content streams, in accordance with at least one embodiment.

FIG. 7 illustrates a workflow of a synchronization feature for synchronizing content streams, in accordance with at least one embodiment. The workflow of FIG. 7 includes, at operation one, streaming device 702 providing streaming content and a manifest file 704, via network 706, to synchronization service provider computers 708. In embodiments, the synchronization service provider computers 708 may generate reference time information 710 for the streaming device 702 and content stream 704. In accordance with at least one embodiment, the synchronization features described herein provide for synchronizing one or more streams of content based on input that indicates a desired association between the one or more streams. For example, a single streaming device, such as streaming device 702, may generate and capture multiple content streams using the same device and broadcasting software that they wish to synchronize for playback purposes. To continue the example, a video game streamer may wish to capture one stream that includes a web camera feed of their keyboard and mouse and synchronize this content stream with another content stream, captured by the same device, of video game content. In embodiments, a user associated with the streaming device may provide input which the synchronization service provider computers 708 may use to associate the multiple content streams together. Once an association is made between content streams, the synchronization service provider computers may utilize the reference time information 710 and/or capture times from the streaming device(s) to modify manifest files for use in instructing a user interface to synchronize playback of the content streams. In embodiments, the reference time information at 710 does not need to be associated with the beginning of an event that is being live-streamed but instead can be associated with a content stream that is already in progress or an archived content stream. In such embodiments the synchronization service provider computers 708 may generate the reference time information 710 based on capture time information from a streaming device (e.g., streaming device 702) or based on information obtained from the content itself such as a game clock, watermark, or other methods described herein.

In embodiments, other indicators of association may be used to associate content streams for synchronization and playback. For example, as illustrated in FIG. 7, another content provider may wish to associate their content stream with a content stream that is being broadcast as opposed to attempting to associate their content stream with another content stream at the beginning of an event or at time zero. The synchronization service provider computers 708 may be configured to associate content streams based on input from users such as other content providers or viewers or users who are consuming multiple content streams simultaneously. To continue the workflow 700 of FIG. 7, at 712, the streaming device 702 may continue to provide content for a period of time. At operation two of workflow 700 another streaming device (streaming device 714) may provide an indication of association, streaming content, and a manifest file 716, via network 706, to synchronization service provider computers 708. In accordance with at least one embodiment, the synchronization service provider computers 708 may associate the content streams at 718 based on the association indication 716. The synchronization service provider computers 708 may modify the manifest files at 720 for content streams 704 and 716 and generate synchronization instructions for a user interface consuming both content streams at 722.

Figure 8:
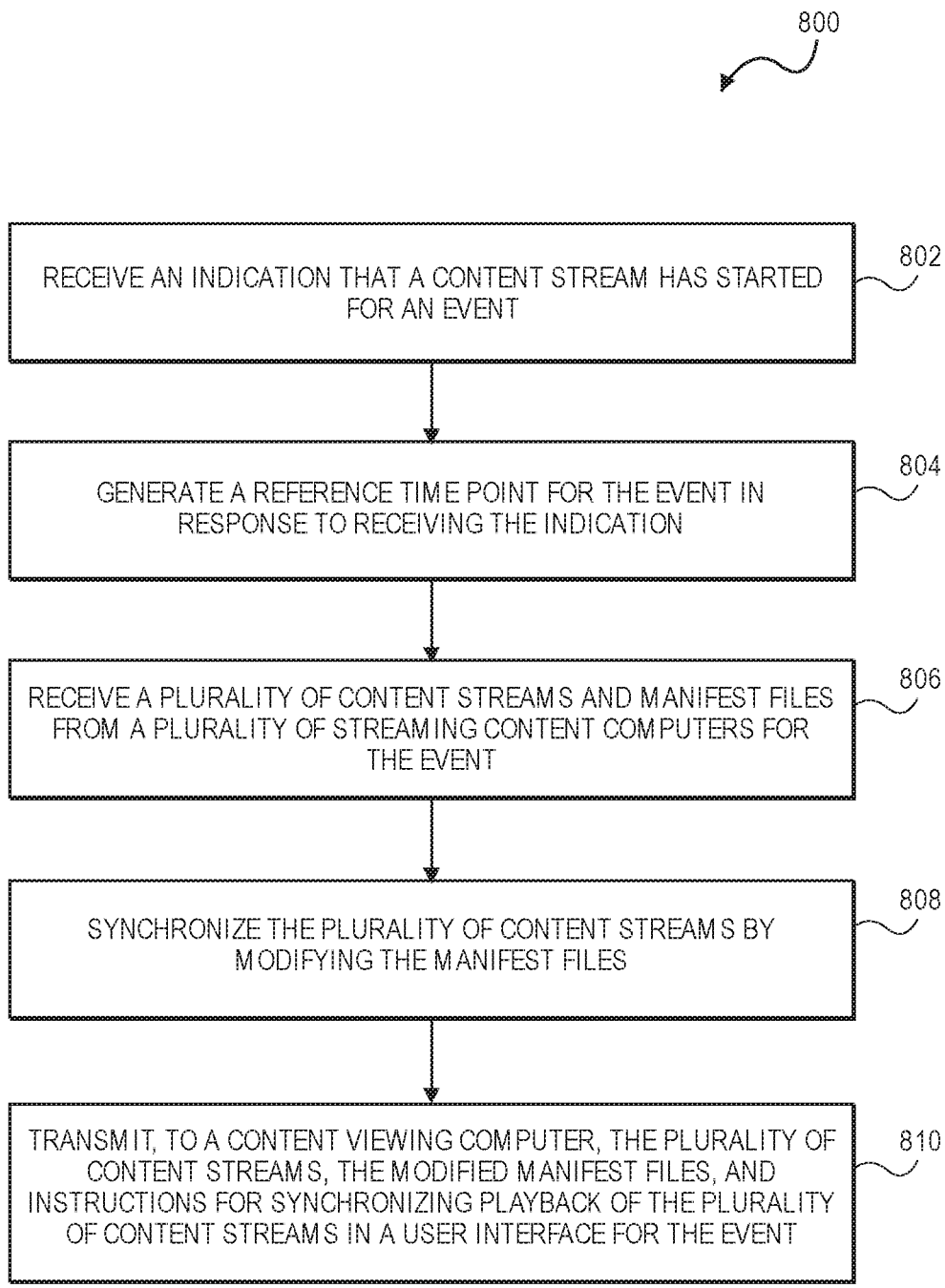
FIG. 8 illustrates an example flowchart for a synchronization feature, in accordance with at least one embodiment.
Figure 9:
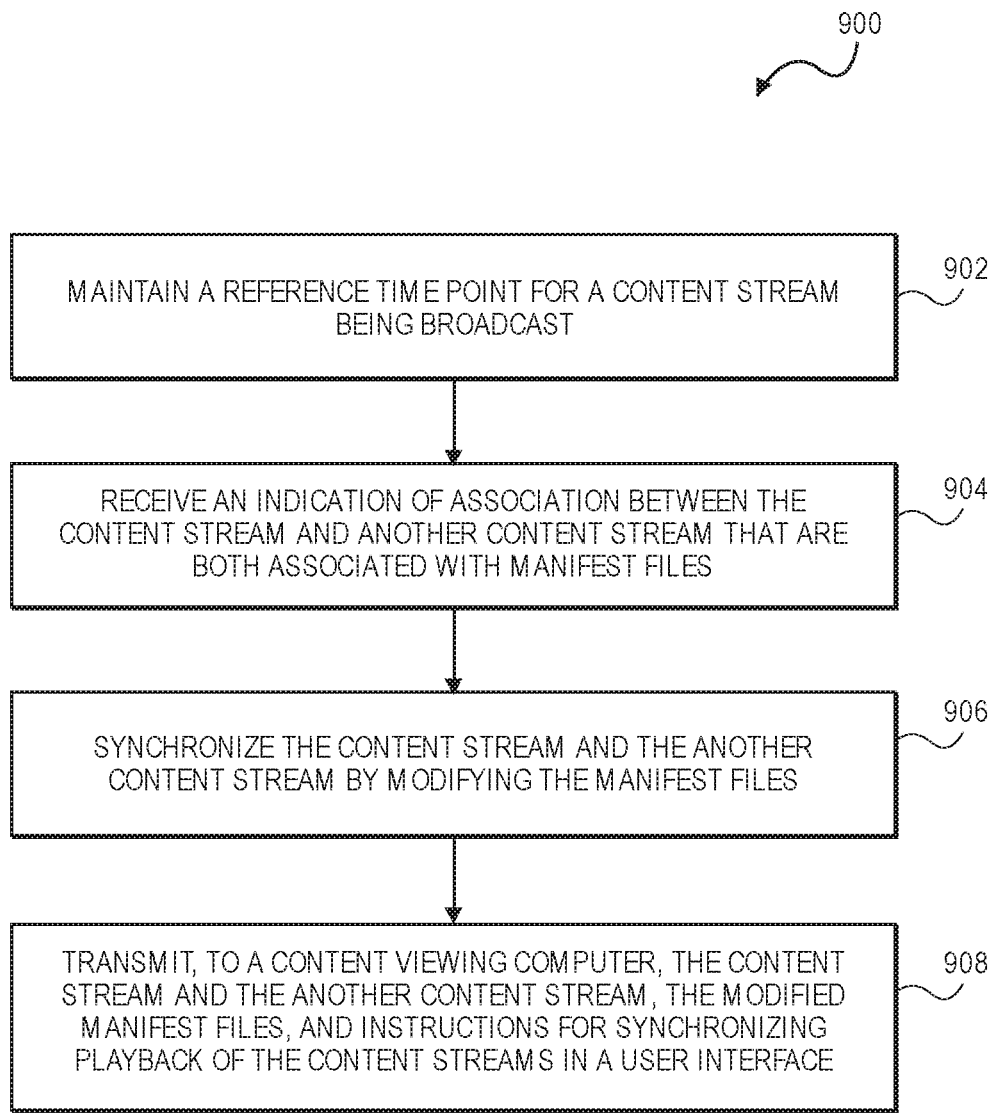
FIG. 9 illustrates an example flowchart for a synchronization feature, in accordance with at least one embodiment.

FIGS. 8 and 9 illustrate example flow charts for a synchronization feature, according to embodiments. These processes are illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs objects, components, data structures, and the like that perform particular functions or implement particular data types. The order in which the operations are described is not intended to be construed as a limitation, and any number of the described operations can be combined in any order and/or in parallel to implement the process.

Additionally, some, any, or all of the processes (or any other processes described herein, or variations and/or combination thereof) may be performed under the control of one or more computer systems configured with executable instructions and may be implemented as code (e.g., executable instructions, one or more computer programs, or one or more applications) executing collectively on one or more processors, by hardware or combinations thereof. As noted above, the code may be stored on a computer-readable storage medium, for example, in the form of a computer program including a plurality of instructions executable by one or more processors. The computer-readable storage medium may be non-transitory.

Figure 10:
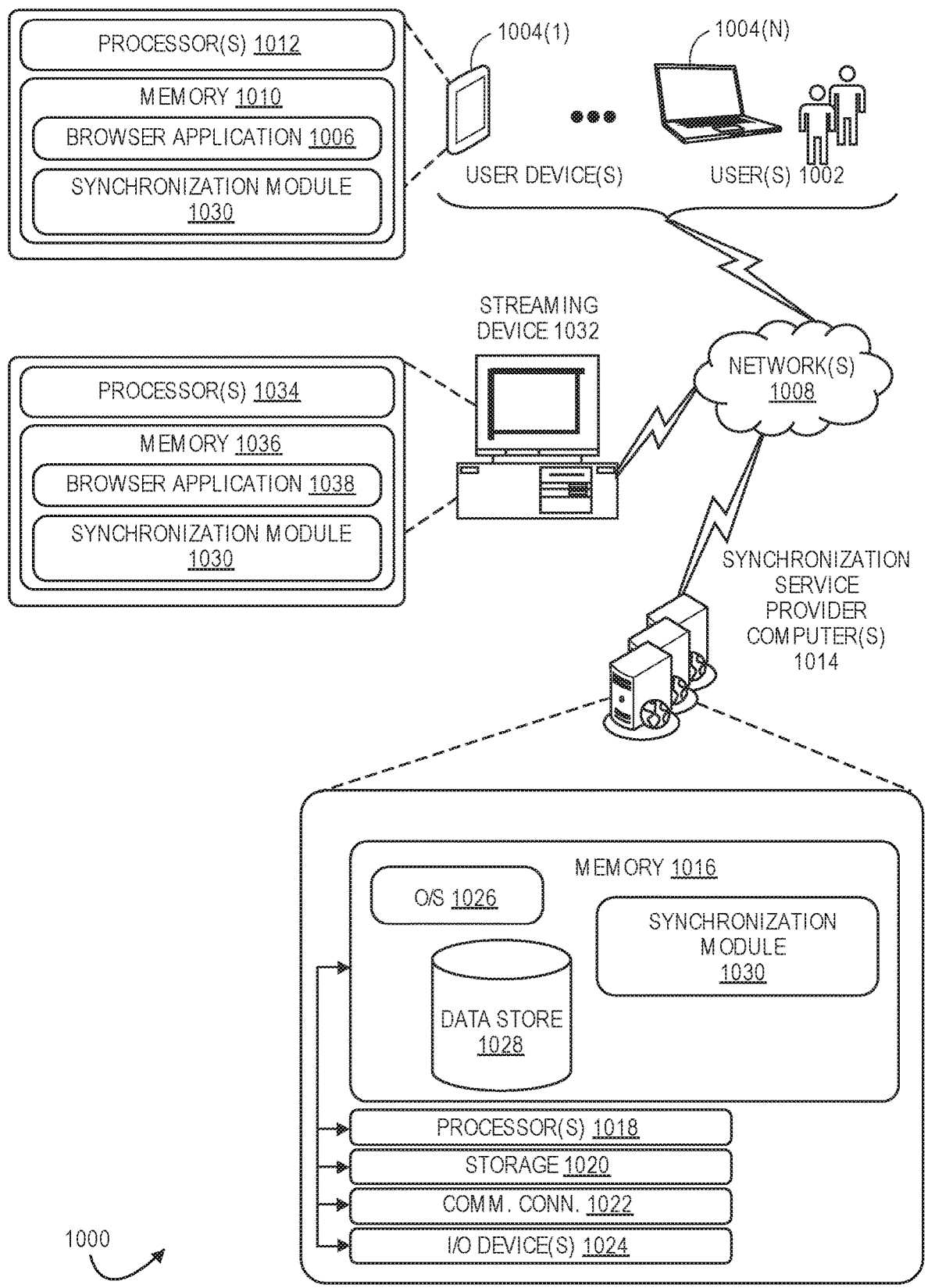
FIG. 10 illustrates an example architecture for implementing a synchronization feature, in accordance with at least one embodiment.

In some examples, the service provider computers (synchronization service provider computers 102, 708, 1014) utilizing at least the synchronization module 1030 depicted in FIG. 10 may perform the processes 800 and 900 of FIGS. 8 and 9. In FIG. 8, the process 800 may include receiving an indication that a content stream has started for an event at 802. In embodiments, the service provider computer may receive an indication, an application programming interface (API) call, or other computer generated message from a content provider's streaming device that identifies that they are actively live-streaming or capturing an event. The process 800 may include generating a reference time point for the event in response to receiving the indication at 804. In accordance with at least one embodiment, the service provider computers may utilize a network time protocol (NTP) to generate the reference time point in response to receiving the indication described at 802. In embodiments, information provided by the event, such as a live-video game event, may be used to generate the reference time point. For example, an in-game clock may be used to generate the reference time point by the service provider computers.

The process 800 may include receiving a plurality of content streams and manifest files from a plurality of streaming content computers for the event at 806. In embodiments, each manifest file may include a segment template and a timeline for a segment of content included in the content stream. The timeline may identify a capture time for the content generated by an associated streaming content computer. The process 800 may include synchronizing the plurality of content streams by modifying the manifest files at 808. In accordance with at least one embodiment, modifying the manifest files is based at least in part on capture times included in the manifest files and the reference time point and includes incorporating the reference time point into the manifest file. The process 800 may include transmitting, to a content viewing computer, the plurality of content streams, the modified manifest files, and instructions for synchronizing playback of the plurality of content streams in a user interface for the event at 810. In embodiments, the instructions for synchronizing playback of the plurality of content streams in the user interface is based at least in part on the capture times, the reference time point, and a current time provided by the content viewing computer. In accordance with at least one embodiment, an application (software application) of the content viewing computer may remove a particular content stream of the plurality of content streams in response to a certain time duration elapsing between when the modified manifest files and content streams are received from the service provider computer and when the content stream and manifest file are received for the particular content stream. The user interface may be updated to reflect removal of the particular content stream which may be caused by increased latency or other network problems associated with the particular streaming device that corresponds to the particular content stream. This enables the synchronized playback for the remaining portion of content streams to continue without affecting the consumption experience for the user.

The process 900 may include maintaining a reference time point for content stream being broadcast at 902. In embodiments, a content being broadcast includes a live-stream broadcast of content captured by a streaming device as well as presentation of archived or previously captured content by the streaming device. The process 900 may include receiving an indication of association between the content stream and another content stream that are both associated with manifest files (e.g., both streams have associated manifest files) at 904. In embodiments, the process 900 may include synchronizing the content stream and the another content stream by modifying the manifest files at 906. The process 900 may include transmitting, to a content viewing computer, the content stream and the another content stream, the modified manifest files, and instructions for synchronizing playback of the content streams in a user interface at 908. In embodiments, the service provider computer implementing the synchronization feature may be configured to determine a relevance value for each content stream of the plurality of content streams based at least in part on input provided by a user associated with the content viewing computer. For example, a user may actively use an input/output device of their user device to select a particular content stream of the plurality of content streams. The input may be used to designate the particular content stream as the current most relevant stream. An update to the relevancy value for a stream may cause modification of the user interface which changes the size (pixel size) for the particular content stream within the user interface as well as updates the X and Y position of the particular content stream within the user interface.

In accordance with at least one embodiment, the service provider computers may be configured to determine a relevance value for each content stream of the plurality of content streams based at least in part on in-game information provided by a video game, wherein the event is a live-streamed video game. For example, the in-game information provided by the video game may include a particular graphic, text, or audio data point that can be used by the service provider computer to determine a relevance value for the corresponding content stream. To further illustrate the example, in a video game a particular player that is live-streaming their gameplay of the video game may score three kill shots on an enemy team which can cause the video game to provide a graphic indicating a "triple kill." The service provider computer may be configured to listen for the graphic representation of "triple kill" and respond by increasing the relevancy value for that particular content stream. In embodiments, determining the relevancy value may be based at least in part on aggregate user input provided by users interacting with the plurality of content streams. Aggregate user input may include chat comments, emotes, donations, etc., provided by the users, active clicks or interactions with the particular content stream, or views of the particular content stream. In embodiments, determining a relevancy value may be based at least in part on using a pre-programmed audio fingerprint that analyzes a content stream for certain audio patterns or utterances to determine the relevancy value. Determining the relevancy value may be based at least in part on performing optical character recognition in a video frame of a content stream to identify certain characters or triggers which enable the service provider computer to determine a relevancy value for a particular content stream.

In accordance with at least one embodiment, the relevancy value for a content stream may be determined by the service provider computer based at least in part on input provided by the content streaming user or streaming device itself. For example, information identifying actions per minute (APM) performed by the streamer may be used to determine a relevancy value for the corresponding content stream where higher APMs result in a higher relevancy value. In embodiments, instructions for synchronizing playback of multiple content streams for an event may identify a layout or user interface structure to present the multiple content streams according to their relevancy. For example, primary, secondary, tertiary, etc., portions of the user interface may be identified and utilized to present most relevant, second most relevant, and so on content streams simultaneously. A primary portion of the user interface may include a larger size (pixel size) of the user interface and be located in a more prominent position within the user interface (X and Y position). As relevancy values between the streams are updated based on the attributes or metrics described herein, instructions may be provided or generated for updating the user interface to reflect the change in relevancy. For example, a stream that was previously most relevant and presented in the primary portion of the user interface may be swapped or exchanged (size as well as X and Y position updated) with a stream that was previously second most relevant.

The updating of the user interface to reflect updated relevancy values between the content streams may be performed at a certain pace or speed that represents a gradual replacement of positions and size between any two or more given content streams within the user interface. In accordance with at least one embodiment, a user may prefer to control when to switch between the plurality of content streams being presented synchronously. The synchronization feature described herein also includes providing a visual or audio indicator of a particular content stream within the user interface presenting the multiple content streams to indicate to a user information about a more relevant content stream as determined by the attributes described herein. A user may choose to respond to the indicator by using an input/output device to interact with the particular content stream that has a visual indicator of relevancy or audio indicator of relevancy or choose not to respond as they are content with their current user interface presentation of the multiple content streams.

FIG. 10 illustrates an example architecture for implementing a synchronization feature, in accordance with at least one embodiment. In architecture 1000, one or more users 1002 (e.g., content viewers) may utilize user computing devices 1004(1)-(N) (collectively, user devices 1004) to access a browser application 1006 or a user interface (UI) accessible through the browser application 1006, via one or more networks 1008 to interact or consume synchronized content streams from one or more streaming devices 1032 according to the synchronization features disclosed herein. In embodiments, the one or more users 1002 may utilize user computing devices 1004(1)-(N) to access the browser application 1006 or a UI accessible through the browser application 1006, via one or more networks 1008, to request content from a streaming device 1032 via synchronization service provider computers (service provider computers) 1014. The "browser application" 1006 can be any browser control or native application that can access and display a network page or other information such as a user interface of a native software application for enabling interaction and consumption of a content stream provided by a content provider as disclosed herein. A native software application may include an application or program that has been developed for use on a particular platform (such as an operating system) or a particular device (such as a particular type of mobile device or user device 1004). In embodiments, the user device 1004 may include one or more components for enabling the user 1002 to interact with the browser application 1006 such as input/output devices, monitors, speakers, microphones, etc.

The user devices 1004 may include at least one memory 1010 and one or more processing units or processor(s) 1012. The memory 1010 may store program instructions that are loadable and executable on the processor(s) 1012, as well as data generated during the execution of these programs. Depending on the configuration and type of the user devices 1004, the memory 1010 may be volatile (such as random access memory (RAM)) and/or non-volatile (such as read-only memory (ROM), flash memory, etc.). The user devices 1004 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the user devices 1004. In some implementations, the memory 1010 may include multiple different types of memory, such as static random access memory (SRAM), dynamic random access memory (DRAM), or ROM.

Turning to the contents of the memory 1010 in more detail, the memory 1010 may include an operating system and one or more application programs or services for implementing the features disclosed herein. Additionally, the memory 1010 may include one or more modules for implementing the features described herein including the synchronization module 1030.

The architecture 1000 may also include one or more service provider computers 1014 that may, in some examples, provide computing resources such as, but not limited to, client entities, low latency data storage, durable data store, data access, management, virtualization, hosted computing environment or "cloud-based" solutions, electronic content performance management, media streaming services, content generation, etc. The service provider computers 1014 may implement or be an example of the synchronization service provider computer(s) described herein with reference to FIGS. 1-9 and throughout the disclosure. The one or more service provider computers 1014 may also be operable to provide site hosting, media streaming services, computer application development, and/or implementation platforms, combinations of the foregoing, or the like to the one or more users 1002 via user devices 1004.

In some examples, the networks 1008 may include any one or a combination of many different types of networks, such as cable networks, the Internet, wireless networks, cellular networks, and other private and/or public networks. While the illustrated examples represent the users 1002 communicating with the service provider computers 1014 over the networks 1008, the described techniques may equally apply in instances where the users 1002 interact with the one or more service provider computers 1014 via the one or more user devices 1004 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer arrangements, etc.).

The one or more service provider computers 1014 may be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more service provider computers 1014 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or distributed computing environment. In some examples, the one or more service provider computers 1014 may be in communication with the user device 1004 via the networks 1008, or via other network connections. The one or more service provider computers 1014 may include one or more servers, perhaps arranged in a cluster or as individual servers not associated with one another.

In one illustrative configuration, the one or more service provider computers 1014 may include at least one memory 1016 and one or more processing units or processor(s) 1018. The processor(s) 1018 may be implemented as appropriate in hardware, computer-executable instructions, firmware, or combination thereof. Computer-executable instruction or firmware implementations of the processor(s) 1018 may include computer-executable or machine-executable instructions written in any suitable programming language to perform the various functions described when executed by a hardware computing device, such as a processor. The memory 1016 may store program instructions that are loadable and executable on the processor(s) 1018, as well as data generated during the execution of these programs. Depending on the configuration and type of the one or more service provider computers 1014, the memory 1016 may be volatile (such as RAM) and/or non-volatile (such as ROM, flash memory, etc.). The one or more service provider computers 1014 or servers may also include additional storage 1020, which may include removable storage and/or non-removable storage. The additional storage 1020 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 1016 may include multiple different types of memory, such as SRAM, DRAM, or ROM.

The memory 1016, the additional storage 1020, both removable and non-removable, are all examples of non-transitory computer-readable storage media. For example, computer-readable storage media may include volatile or non-volatile, removable or non-removable media implemented in any method or technology for storage of information such as computer-readable instructions, data structures, program modules, or other data. The memory 1016 and the additional storage 1020 are all examples of non-transitory computer storage media. Additional types of non-transitory computer storage media that may be present in the one or more service provider computers 1014 may include, but are not limited to, PRAM, SRAM, DRAM, RAM, ROM, EEPROM, flash memory or other memory technology, CD-ROM, DVD, or other optical storage, magnetic cassettes, magnetic tape, magnetic disk storage or other magnetic storage devices, or any other medium which can be used to store the desired information and which can be accessed by the one or more service provider computers 1014. Combinations of any of the above should also be included within the scope of non-transitory computer-readable media.

The one or more service provider computers 1014 may also contain communication connection interface(s) 1022 that allow the one or more service provider computers 1014 to communicate with a data store, another computing device or server, user terminals, and/or other devices on the networks 1008. The one or more service provider computers 1014 may also include I/O device(s) 1024, such as a keyboard, a mouse, a pen, a voice input device, a touch input device, a display, speakers, a printer, etc.

Turning to the contents of the memory 1016 in more detail, the memory 1016 may include an operating system 1026, one or more data stores 1028, and/or one or more application programs or services for implementing the features disclosed herein including the synchronization module 1030. In accordance with at least one embodiment, the synchronization module 1030 may be configured to generate time reference points for use in modifying manifest files received with content streams provided by content providers and transmit instructions for synchronizing playback, via a user interface, of the content streams on a user device. In embodiments, the synchronization module 1030 may be configured to combine or merge audio and chat streams that are associated with the received content streams as well as reduce the volume of the less relevant chat streams and audio streams as described herein. The synchronization module 1030 may be configured to generate relevancy values for each content stream based on user input, aggregate user input, in-game information, or information provided by the content providers or content streamers. The architecture of FIG. 10 also includes a streaming device 1032 that further includes a processor 1034, memory 1036, a browser application 1038, and the synchronization module 1030. The streaming device 1032 may be an example of a user device 1004 and the configuration and functionality of components 1034, 1036, and 1038 are disclosed above with respect to browser application 1006, memory 1010, processor 1012, and synchronization module 1030. In embodiments, content providers (not pictured) may interact with the streaming device 1032 to provide content streams and manifest files, via network 1008, to service provider computers 1014 for subsequent consumption by user 1002 via user device 1004. In some embodiments, content providers may utilize the browser application 1038 or other native software application such as a broadcasting application to provide the content stream (streaming video, audio, and system messages for a content stream) for an event to the service provider computers 1014 via networks 1008. In accordance with at least one embodiment, the synchronization module 1030 is configured to obtain a capture time (capture time information) that corresponds to a time reference for the data being captured or provided by the streaming device 1032 as well as a current time which corresponds to a current viewing time for the user device 1004 as described herein.

Figure 11:
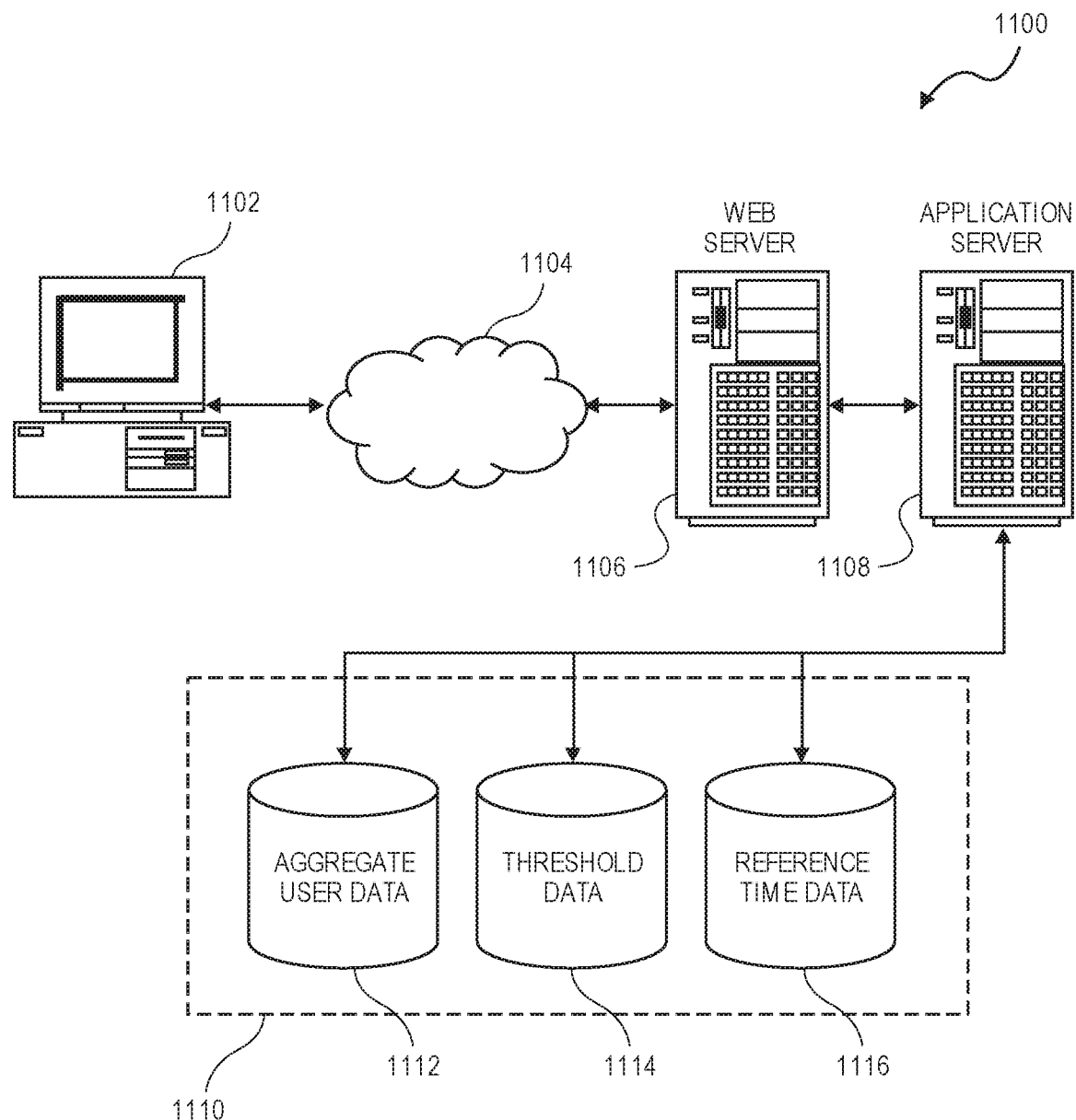
FIG. 11 illustrates an environment in which various embodiments can be implemented.

FIG. 11 illustrates aspects of an example environment 1100 for implementing aspects in accordance with various embodiments. As will be appreciated, although a Web-based environment is used for purposes of explanation, different environments may be used, as appropriate, to implement various embodiments. The environment includes an electronic client device 1102, which can include any appropriate device operable to send and receive requests, messages, or information over an appropriate network 1104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1102 and the application server 1108, can be handled by the Web server. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing aggregate user data 1112 and reference time data 1116, which can be used to serve content for the production side, determine a relevance value for one or more content streams, and generate and maintain reference time information/data for modifying manifest files and synchronizing multiple content streams for an event (a live streaming event). The data store also is shown to include a mechanism for storing threshold data 1114, which can be used for reporting, analysis, or other such purposes such as maintaining one or more thresholds which can be specified by users or content providers for identifying how quickly or slowly a relevance of a stream should be used to modify the user interface. It should be understood that there can be many other aspects that may need to be stored in the data store, such as for page image information and to access right information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1102. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving, by a server computer, an indication that a content stream is being broadcasted;
   generating, by the server computer, a reference time point for the content stream in response to receiving the indication;
   receiving, by the server computer, a plurality of content streams and associated manifest files from a plurality of streaming content computers, a manifest file of the manifest files including a segment template and a timeline for a segment of content included in the plurality of content streams, the timeline identifying a capture time for the content generated by an associated streaming content computer of the streaming content computers;
   synchronizing, by the server computer, the plurality of content streams by modifying the manifest files to create modified manifest files, the modifying of the manifest files based at least in part on capture times included in the manifest files and the reference time point, wherein modifying each manifest file includes incorporating the reference time point;
   transmitting, by the server computer and to a content viewing computer, the plurality of content streams, the modified manifest files, and instructions for synchronizing playback of the plurality of content streams in a user interface based at least in part on the capture times, the reference time point, and a current time provided by the content viewing computer; and
   determining, by the server computer, a relevance value for the content stream and another content stream based at least in part on aggregate user input provided by users interacting with the content stream and the another content stream, the another content stream being of the plurality of content streams.

2. The computer-implemented method of claim 1, wherein synchronizing playback of the plurality of content streams includes buffering a particular content stream of the plurality of content streams based at least in part on a corresponding capture time for the particular content stream and capture times for a remaining portion of the plurality of content streams.

3. The computer-implemented method of claim 1, wherein generating the reference time point includes using a network time protocol.

4. The computer-implemented method of claim 1, wherein the content stream is associated with an event, the event being a live streaming video game event and, wherein generating the reference time point includes using an in video game time clock for the event.

5. The computer-implemented method of claim 1, further comprising removing, by an application of the content viewing computer, a particular content stream of the plurality of content streams in response to a certain time duration elapsing between when the modified manifest files are received for a remaining portion of the plurality of content streams and a particular modified manifest file for the particular content stream.

6. A computer-implemented method, comprising:
   maintaining, by a server computer, a reference time point for a content stream being broadcast;
   receiving, by the server computer, an indication of an association between the content stream and another content stream, the content stream and the another content stream associated with manifest files, a manifest file of the manifest files including a segment template and a timeline for a segment of content corresponding to the content stream and the another content stream, the timeline identifying a capture time for the content generated by an associated streaming device for the content stream and the another content stream;
   synchronizing, by the server computer, the content stream and the another content stream by modifying the manifest files to create modified manifest files in response to receiving the indication, the modifying of the manifest files based at least in part on capture times included in the manifest files and the reference time point, wherein modifying each manifest file includes incorporating the reference time point;
   transmitting, by the server computer and to a content viewing computer, the content stream and the another content stream, the modified manifest files, and instructions for synchronizing playback of the content stream and the another content stream in a user interface based at least in part on the capture times, the reference time point, and a current time provided by the content viewing computer; and
   determining, by the server computer, a relevance value for the content stream and the another content stream based at least in part on aggregate user input provided by users interacting with the content stream and the another content stream.

7. The computer-implemented method of claim 6, wherein the indication of the association is based at least in part on information from a broadcasting application of a streaming device associated with the content stream.

8. The computer-implemented method of claim 6, wherein the indication of the association is based at least in part on input from a streaming device associated with the another content stream.

9. The computer-implemented method of claim 6, wherein the indication of the association is based at least in part on input from the content viewing computer, the content stream and the another content stream associated with a same event.

10. The computer-implemented method of claim 6, further comprising determining, by the server computer, a relevance value for the content stream and the another content stream based at least in part on input provided by a user associated with the content viewing computer.

11. The computer-implemented method of claim 6, further comprising determining, by the server computer, a relevance value for the content stream and the another content stream based at least in part on in-game information provided by a video game, wherein the content stream and the another content stream are associated with a live-streamed video game.

12. The computer-implemented method of claim 11, wherein the server computer obtains the in-game information based at least in part on utilizing an event listener that provides the in-game information to the server computer in response to identifying certain events or data provided by the video game.

13. The computer-implemented method of claim 6, further comprising determining, by the server computer, a relevance value for the content stream and the another content stream based at least in part on input provided by content streamers associated with the content stream and the another content stream.

14. The computer-implemented method of claim 6, further comprising:
   determining, by the server computer, a relevance value for the content stream and the another content stream based at least in part on aggregate user input provided by users interacting with the content stream and the another content stream; and
   instructing, by the server computer, the content viewing computer to modify the user interface to present the content stream in a first portion of the user interface based at least in part on an associated relevance value for the content stream and present the another content stream in a second portion of the user interface, wherein the second portion of the user interface is smaller than the first portion of the user interface and, wherein the second portion of the user interface is presented in a different position within the user interface than the first portion of the user interface.

15. The computer-implemented method of claim 14, further comprising:
   receiving, by the server computer, updated aggregate user input from the users interacting with the content stream and the another content stream; and
   instructing, by the server computer, the content viewing computer to modify the user interface to replace the first portion of the user interface with the another content stream and replace the second portion of the user interface with the content stream based at least in part on the updated aggregate user input, wherein replacing the first portion and the second portion occurs at a periodic pace.

16. The computer-implemented method of claim 6, further comprising:
   determining, by the server computer, a relevance value for the content stream and the another content stream based at least in part on aggregate user input provided by users interacting with the content stream and the another content stream; and
   instructing, by the server computer, the content viewing computer to modify the user interface to provide a visual indicator of the relevance value for each of the content stream and the another content stream based at least in part on the corresponding relevance value for the content stream and the another content stream and, generate an audio indicator to correspond to the visual indicator that represents the relevancy value.

17. A computer system comprising:
   a memory configured to store computer-executable instructions; and
   a processor in communication with the memory configured to execute the computer-executable instructions to at least:
   maintain a reference time point for a content stream;
   associate the content stream with another content stream based at least in part on input from a user, the content stream and the another content stream associated with manifest files, a manifest file of the manifest files including a segment template and a timeline for a segment of content included in the content stream and the another content stream, the timeline identifying a capture time for the content generated by an associated streaming device for the content stream and the another content stream;
   synchronize the content stream and the another content stream by modifying the manifest files to create modified manifest files, the modifying of the manifest files based at least in part on capture times included in the manifest files and the reference time point, wherein modifying each manifest file includes incorporating the reference time point;
   combine one or more chat streams associated with the content stream and the another content stream into a single chat stream; and
   transmit, to a content viewing computer, the single chat stream, the content stream and the another content stream, and the modified manifest files, wherein the instructions further identify interleaving the single chat stream with the content stream and the another content stream in the user interface.

18. The computer system of claim 17, wherein the processor is further configured to transmit, to a content viewing computer, the content stream and the another content stream, the modified manifest files, and instructions for synchronizing playback of content stream and the another content stream in a user interface based at least in part on the capture times, the reference time point, and a current time provided by the content viewing computer.

19. The computer system of claim 17, wherein the processor is further configured to:
   receive a new content stream and a new manifest file from a new streaming device; and
   modify the new manifest file to incorporate the reference time point.

20. The computer system of claim 18, wherein the processor is further configured to:

analyze the content included in the content stream and the another content stream to identify a synchronization indicator, wherein synchronizing the content stream and the another content stream further includes using the synchronization indicator.

21. The computer system of claim 17, wherein combining the one or more chat streams into the single chat stream includes removing text from a portion of the one or more chat streams based on a relevancy value associated with each chat stream of the one or more chat streams.

22. The computer system of claim 18, wherein the processor is further configured to:

combine one or more audio streams associated with the content stream and the another content stream into a single audio stream; and transmit, to the content viewing computer, the single audio stream, the content stream and the another content stream, and the modified manifest files, wherein the instructions further identify interleaving the single audio stream with the content stream and the another content stream presented via the user interface and the content viewing computer.

23. The computer system of claim 22, wherein combining the one or more audio streams into the single audio stream includes reducing a volume from a portion of the one or more audio streams based on a relevancy value associated with each audio stream of the one or more audio streams.

24. The computer system of claim 17, wherein the processor is further configured to:

generate a highlight video file based at least in part on aggregate user input provided by users interacting with the content stream and the another content stream; and transmit the highlight video file to the content viewing computer for interleaving into the content stream and the another content stream presented via the user interface.

25. The computer system of claim 18, wherein the processor is further configured to maintain one or more user specified thresholds that identify a speed of modifying the user interface based on relevancy values associated with the content stream and the another content stream.

\* \* \* \* \*